June 19, 1928.

O. R. HUMPHREYS ET AL 1,674,011

CLUTCH

Filed July 23, 1927

2 Sheets-Sheet 1

Inventors
O. R. Humphreys
W. G. Humphreys
By Arthur H. Sturges,
Attorney

June 19, 1928.

O. R. HUMPHREYS ET AL 1,674,011

CLUTCH

Filed July 23, 1927

2 Sheets-Sheet 2

Inventors
O. R. Humphreys
W. G. Humphreys
By Arthur H. Sturges
Attorney

Patented June 19, 1928.

1,674,011

UNITED STATES PATENT OFFICE.

OMAR R. HUMPHREYS AND WALTER G. HUMPHREYS, OF OMAHA, NEBRASKA.

CLUTCH.

Application filed July 23, 1927. Serial No. 207,929.

The present invention relates to clutches, and has particular reference to double acting clutches.

An object of this invention is to provide a clutch which will operate equally well when the driving axle is going in either a forward or a reverse direction.

Another object of this invention is to provide a clutch which will operate in conjunction with a brake whereby to release the clutch simultaneously with the application of the brake.

A further object of this invention is to provide means whereby the locking means of the clutch will rotate with the clutch.

A still further object of this invention is to provide a clutch which is positive in operation and eliminates any possibility of slippage between the drive member and the driven member.

Figure 1:
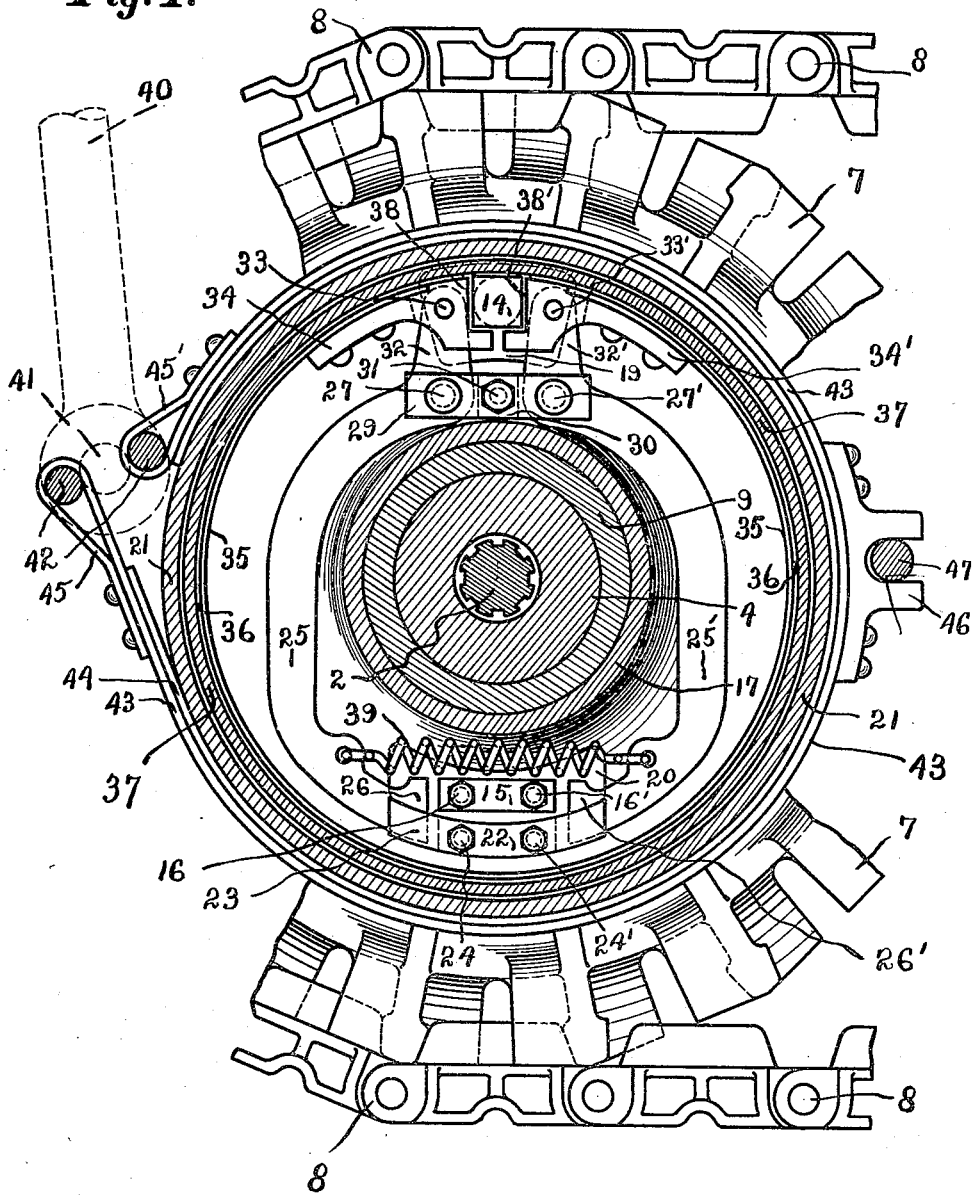
Figure 2:
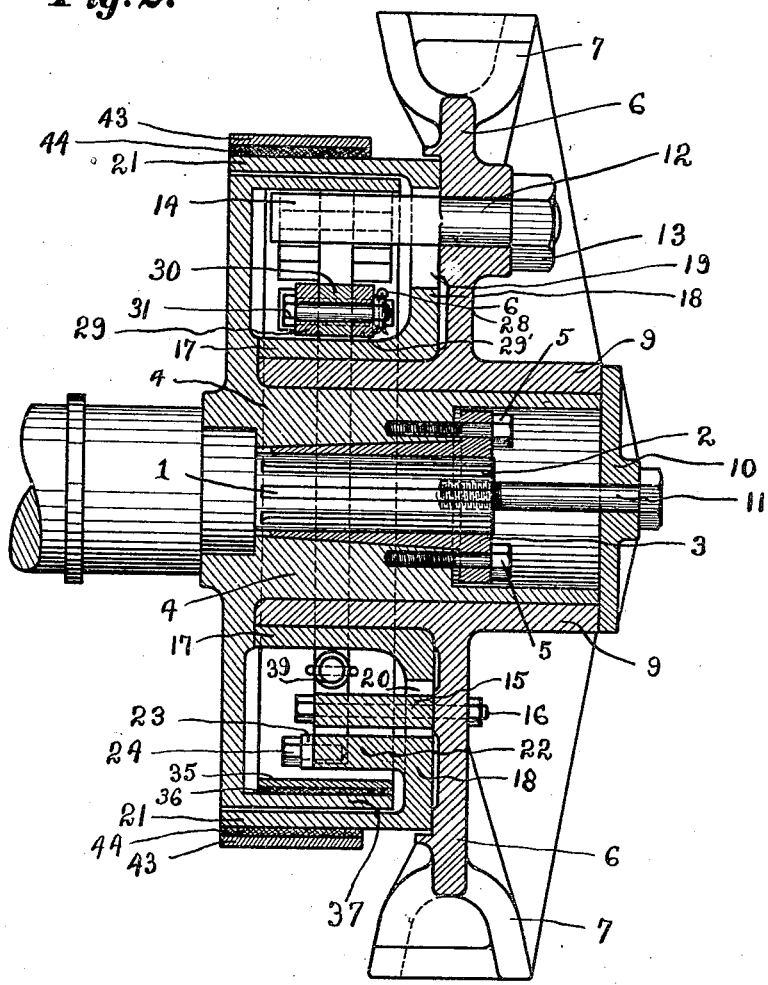

The above and various other objects and advantages of this invention will in part be described in and in part be understood from the following detailed description of the present preferred embodiment, the same being illustrated in the accompanying drawings, wherein:

Fig. 1 is a detailed end view of a clutch constructed according to the present invention and applied to a sprocket which is here partly broken away, and Fig. 2 is a section view of the same taken substantially through the center thereof.

Referring to the drawings, and first to Fig. 2, the numeral 1 represents a drive shaft from any suitable source of power which has a splined portion 2 at its outer end, as more particularly shown in Fig. 1. A circular wedge block 3 is adapted to fit upon and register with the splined end 2 of the shaft 1, and a sleeve or hub 4 is adapted to closely fit around the wedge block 3, being firmly secured thereto by bolts 5 or the like.

A wheel 6 having a plurality of sprockets 7 on the periphery thereof and in which a chain 8 is adapted to register is provided with a sleeve or hub 9 which is loosely mounted on the periphery of the sleeve 4 and adapted for rotary movement thereupon. The sleeve or hub 9 may be retained upon the hub 4 by means of a washer 10 which may be secured to the splined portion 2 of the shaft 1 by a bolt 11 or the like.

A driving pin 12 is mounted on said wheel 6 and is retained thereon by a nut 13. The pin 12 is preferably provided with a square shank at its inner end for purposes later described. The wheel 6 is also provided with a lug 15 which is secured to said wheel by bolts 16 or the like. A sleeve or hub 17 is adapted to be loosely mounted on the periphery of the inner end of the hub 9 and a disc or wheel 18 is secured to the outer end of said hub 17, said disc 18 being parallel with said wheel 6 and at right angles to said shaft 1.

The disc 18 is provided with slots 19 and 20 for receiving therethrough the pin 12 and the lug 15 respectively. An annular flange 21 extends inwardly from said disc 18. The purpose of this flange will be later described. The disc 18 is also provided with a stop lug 22 to which is secured a guide 23 by means of bolts 24 or the like.

Referring to Fig. 1 a pair of opposed levers 25 and 25' having at their lower ends heads 26 and 26' respectively which are preferably mounted in spaced relation to each other, are provided with a connecting block 29 at a point spaced downwardly from the upper end thereof, and the connecting block 29 is secured to said levers 25 and 25' by means of a pair of fulcrum pins 27 and 27' which may be locked in place by a cotter pin 28 or the like. A second connecting link or block 29' may be secured to the levers 25 and 25' at the opposite side of said block 29 and in like manner. A supporting or center piece 30, having a bolt 31, is adapted to hold the connecting links 29 and 29' in spaced relation to each other.

The levers or arms 25 and 25' are provided at their tops with extensions 32 and 32' which are pivoted at 33 and 33', respectively to a pair of bails 34 and 34', the bails 34 and 34' being secured to an expansible brake band 35 which is open at the top thereof. The brake band 35 is provided with a brake lining 36 or the like on the periphery thereof, the lining 36 being secured to the brake band 35 in any suitable manner.

The disc 4 is provided with an outwardly extending flange 37 the inner surface of which is adapted to contact with the brake lining 36 when the same is expanded. The bails 34 and 34′ are provided with suitable angular cutouts 38 and 38′ respectively so that the square shank 14 of the pin 12 may be loosely mounted therebetween. It will be noted that when the heads 26 and 26′ of the arms 25 and 25′ are moved outwardly the extensions 32 and 32′ will move toward each other thereby drawing or carrying the bails 34 and 34′ toward each other and thus contracting the clutch band 35, and this contracting movement of the clutch band will cause the brake lining 36 to draw away from the inside of the drum or flange 37. A coil spring 39 is secured at opposite ends to said lever arms 25 and 25′ and is adapted to normally pull the heads 26 and 26′ toward each other. It will thus be noted that the normal condition of the clutch band 35 is expanded and that the brake lining 36 will normally engage or grip said flange or drum 37.

A brake lever 40 is pivoted at 41 to a suitable part or member of the power mechanism, and a pair of pins 32 are mounted on said lever 40 in spaced relation to each other. An outside brake band 43 having a brake lining 44 secured thereto in any suitable manner has a pair of looped ends 45 and 45′ which are adapted to be mounted on said pins 42. The lining 44 is mounted on the brake band 43 at the inside thereof and is adapted to engage the periphery of the drum 21 when the brake band 43 is contracted. The brake band 43 is normally in spaced relation to the drum 21 so that the lining 44 will not normally engage the drum 21 until the band 43 is contracted by movement of the brake lever 40. The band 43 is provided with a fork detent 46 which is secured thereto in any suitable manner, and a stationary pin 47 may be suitably mounted on the power mechanism so that the brake band 43 will not revolve with said drum 21.

In operation the power is applied to the drive shaft 1, and as the disc 4 having the drum 37 mounted thereon is locked on said shaft 1 by means of the wedge block 3, the disc 4 and drum 37 will revolve with the shaft. As the clutch is normally engaged, when the drum 37 revolves the sprocket wheel 6 will normally move therewith. However, when the lever 40 is applied the brake lining 44 will engage the drum 21 and retard the movement thereof. It is of course understood that with the retarding of the drum 21 the disc 18 is also likewise retarded, and the retarding action of the disc 18 causes the same to drag until the stop lug 22 engages with either head 26 or 26′, depending upon the direction of the movement of the drive shaft 1. By engaging with the heads 26 or 26′ the lever arms 25 or 25′ are moved outwardly, and cooperatively the extensions 32 or 32′ are moved inwardly carrying with their movement the brake band 35, thus contracting the brake band 35 and permitting the drum 37 to move freely. The clutch is now disengaged, and the brake band 43 can be further contracted to entirely stop the movement of the sprocket wheel 6. The action of applying the brake 43 and the release of the clutch is practically simultaneous, and the clutch will stay released until the brake band 43 has been released.

It is of course understood that various changes and modifications may be made in the details of construction and design of the above specifically described embodiment of the invention without departing from the spirit thereof, such changes and modifications being restricted only by the scope of the following claims.

What is claimed is:

1. The combination of a clutch comprising a driving member, a drum mounted on said driving member and adapted to turn therewith, a driven member loosely mounted on said drum, said driven member having a drum loosely mounted thereon, locking means on said second drum for causing said driven member to turn with said driving member, and a brake, said brake being adapted to engage said second drum whereby to cause disengagement of said locking means.

2. A clutch comprising a driving member, a drum mounted on said driving member and being adapted to turn therewith, said drum having an outwardly extending hub, a driven member loosely mounted on said hub, a second drum loosely mounted on said driven member, locking means on said second drum for locking same with said driving member, and retarding means adapted to retard the movement of said driven member whereby to release said locking means.

3. A clutch comprising a driving member, a drum mounted on said driving member and being adapted to turn therewith, an outwardly extending hub on said drum, a driven member adapted to rotate on said hub, a second drum loosely mounted on said driven member, locking means on said second drum for locking same with said driving member, said locking means comprising a pair of pivotally mounted arms, brake means pivoted to said arms, and means for normally expanding said brake means whereby to engage said first drum, and means for contracting said brake means whereby to disengage said brake means from said first drum.

4. A clutch comprising a driving member, a drum mounted on said driving member and being adapted to turn therewith, a driven member pivoted on said drum, a second drum pivoted on said driven member, said second drum being loosely mounted outwardly from said first drum, an expanding brake mounted within said first drum and being connected to and being adapted to revolve with said second drum, means for normally expanding said brake whereby to engage said first drum, and release means for contracting said expanding brake and releasing said driving member from said driven member.

In testimony whereof, we have affixed our signatures.

OMAR R. HUMPHREYS.
WALTER G. HUMPHREYS.